Sept. 5, 1933.　　　W. McL. ROSBOROUGH　　　1,925,153
PROCESS OF MANUFACTURING CASTELLATED OR SLOTTED NUTS OR THE LIKE
Filed Jan. 14, 1932

Fig. 13.

Inventor
W. M. Rosborough,
By
Dorsey & Cole
Attorney

Patented Sept. 5, 1933

1,925,153

UNITED STATES PATENT OFFICE 1,925,153

PROCESS OF MANUFACTURING CASTELLATED OR SLOTTED NUTS OR THE LIKE

William McLure Rosborough, Charlotte, N. C.

Application January 14, 1932. Serial No. 586,633

8 Claims. (Cl. 10—86)

This invention relates to processes for the manufacture of nuts and, with respect to its more specific features, to castellated, slotted and similar nuts.

One of the objects of the invention is to provide a process for manufacturing a nut having an odd number of castles or locking lugs.

Another object is to provide a process for manufacturing a nut having the locking lugs so arranged and spaced that the opening or space between every pair of lugs is opposite another lug and is of the proper width to receive one end of the cross key when the other end is at either side of the opposite lug.

Another object is to provide a process for manufacturing a nut having the locking lugs so constructed and spaced that they will be arranged in pairs with the members of each pair on opposite sides of the nut and on the same side of a line diametrical to the nut and with the symmetrical walls of the lugs in alignment.

Another object is to provide a process for manufacturing a nut that has cross key receiving passages or openings and in which the stock left between the openings forms locking lugs or abutments for engagement by the cross key.

Another object is to provide a process for manufacturing a nut having locking lugs, the inner faces of which have sufficient stock or excess metal removed from them to provide clearances between the lugs and the threads on the bolt, and which consequently has no threads in the lugs.

Another object is to provide a process for manufacturing a nut with a clearance on the inner faces of the locking lugs which utilizes saws, cutters, punches, broaches or similar cutting tools to remove the excess stock.

Another object is to provide a process for manufacturing a nut with cross key passages or openings and locking lugs in which the excess metal is removed from the inner faces of the lugs simultaneously with that from the cross key passages.

Another object is to provide a process for manufacturing a nut which has cross key passages or openings cut parallel to a diameter of the nut blank with sufficient clearance and of such width that when the cross key occupies the opening in the bolt which receives it the key will line up with and engage the symmetrical walls of the locking lugs at opposite sides of the nut, thereby providing a positive lock to prevent the nut from turning in either direction.

Another object is to provide a process for manufacturing a nut which will be lighter in weight and will have less material in it than the conventional nut of the same size, and which will cost less to manufacture.

With these and other objects in view, the invention consists of processes in which I have combined the novel use of tools and the location of cuts with reference to the fixed relationship of the dimensions of the nut blank to secure the manufacturing results as fully described hereinafter, illustrated in the accompanying drawing and embodied in the claims hereto appended: it being understood that various changes in forms, proportions, sizes and minor details of construction within the scope of the claims may be restorted to without departing from the spirit of the invention.

In the drawing:

Figure 13 represents a top plan view of a completed nut which has been fabricated with the locking lugs located opposite the faces of the hexagonal formation instead of opposite the corners as is customary in the conventional castellated or slotted nut.

In the conventional manufacture of a nut designed to be locked to a bolt by a cross key such as F, the receiving passages or openings in the nut for the reception of the key are substantially equal in width to the diameter of the key and they are cut so that they extend diametrically of and are centered with respect to the blank from which the nut is being fabricated, and it follows from this that the number of cuts made is always one-half the lugs that are formed. This conventional process produces a nut which has an even number of locking lugs that are opposite each other and an even number of openings that are also opposite each other.

In the manufacture of nuts of this conventional type the locking lugs are threaded because the metal on the inner faces is not removed. When they are being tapped these lugs strike the flutes of the tap thereby causing the tool to chatter and consequently to cut imperfect threads both in the lugs and in the body of the nut. Furthermore, the tap has a tendency to cause the lugs to spring out especially if it is not very sharp, and this makes the threads lighter in the lugs than they are in the body of the nut. After the tapping operation is completed the lugs may return to their normal position and then the result is that when the nut is screwed onto a bolt the threads in the lugs fit those on the bolt tighter than do those in the body of the nut. It is consequently difficult to produce nuts by this process that will uniformly come within the required tolerance limits. In the ordinary manufacture of nuts of this type clearances cannot be cut on the inner faces of the locking lugs at the same time that the cross key passages are cut. These clearances have to be produced by reboring with a drill in an entirely separate operation.

The primary factors to which I have given consideration in perfecting my processes are the relationship between the width of the cutting tools, the radius of the opening in the nut blank and the radius of the cotter pin or key to be used with the nut; the distance the cutting tools are offset from the center line of the blank, the relationship of this offsetting of the cutting tools one to another, the relationship between the direction and the angle through which the blank is rotated between the cuts, and the relationship between the number of cuts and the number of locking lugs required.

Figure 1:
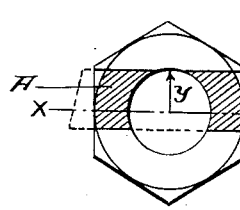
Figure 1 represents a plan view of a nut blank upon which the first cutting operation is being performed in the process where a nut is being fabricated with the metal required to form the threads in the castellated end of the blank left on the inner faces of the locking lugs, thereby leaving the diameter of the hole through the castellated end the same as that through the body of the nut.
Figure 2:
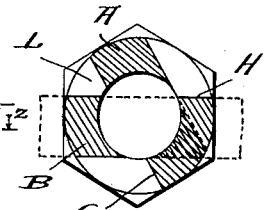
Figure 2 represents the second cutting operation in this process.
Figure 3:
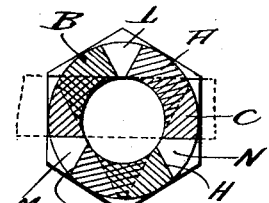
Figure 3 represents the third cutting operation in this process.

In Figures 1 to 3 inclusive I have illustrated my novel process for manufacturing a castellated, slotted or similar nut where saws are used to cut the cross key receiving passages or openings without removing the excess metal from the inner faces of the locking lugs. I have indicated these saws with dotted lines for convenience. It will be understood that the nut blank may be carried beneath the saws by suitable instrumentalities which are not illustrated, being well known in the art, and that the blank is acted upon while travelling beneath the rotating saws. In this process the width of the saws is equal to the sum of the radius Y, of the opening in the blank and the radius Z of the standard cotter pin F that would be used with this nut.

The first operation in this process is shown in Figure 1 where the slot or channel A is being cut. One face of the saw is offset to one side of the center line or axis X—X of the nut blank by a distance equal to the radius Z of the cotter pin and the other face is tangent to the opening in the blank which has the radius Y.

The second operation is shown in Figure 2. The blank has been rotated to the right through an angle of 60° and the channel B is being cut. The saw which makes this cut is of the same width as the one in Figure 1 and is also offset but this time to the opposite side of the axis of the nut blank. It will be observed that while one end of cut B overlaps one end of cut A so that no teat or excess metal is left between the wall G of the cut A, (which will form one of the faces of a locking lug) and the wall H of cut B (which will form one of the faces of another locking lug), the other end of cut B forms an angle with the other end of cut A such as will leave the locking lug L, thus completing the formation of this lug simultaneously with the completion of the removal of the metal between the walls G and H.

The third operation is shown in Figure 3. The blank has again been rotated to the right through an angle of 60° and the channel C is being cut. The saw which makes this cut is of the same width as the other two and is also offset with reference to the axis of the nut blank but is now in alignment with the saw in Figure 1. It will be observed that the cut C in turn, at one end overlaps the end of cut A (opposite the end thereof that overlaps the cut B), so that no teat or excess metal is left between the locking lug N (which is completed by this cutting) and the locking lug L. The other end of cut C forms an angle with the other end of cut A such as will leave the locking lug M, and at the same time overlaps cut B at the opposite end thereof from the end which overlaps cut A, thus completing the locking lug M, so that no teat or excess metal is left between the lug L and the lug M. The third cut thus completes the locking lugs N and M and finishes the removal of the excess metal.

Figure 4:
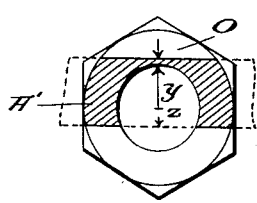
Figure 4 represents a plan view of a nut blank upon which the first cutting operation is being performed in the process where a nut is being fabricated with the excess metal removed from the inner faces of the locking lugs, thereby forming lugs that will not have threads on their inner faces.
Figure 5:
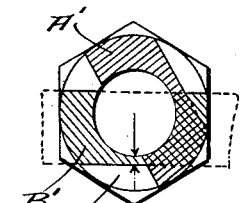
Figure 5 represents the second cutting operation in this process.
Figure 6:
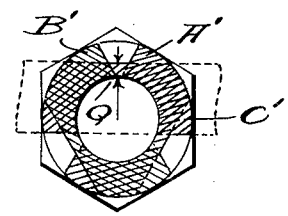
Figure 6 represents the third cutting operation in this process.

In Figures 4 to 6, inclusive, I have illustrated my novel process for manufacturing a castellated, slotted or similar nut where in addition to the operations already described I have also removed the excess stock from the inner walls of the locking lugs at the same time.

The operations are identical with the three already described except that I use saws, the width of each of which is the sum of the radius Y of the opening in the blank, the radius Z of the standard cotter key, and the depth of the threads which is standard for the nut being fabricated.

The first operation in this process is shown in Figure 4 where the channel or slot A' is being cut with the clearance (the distance between the arrows O and Y), such clearance being substantially equal to the depth of the thread which is standard for the nut being fabricated.

The second operation in this process is shown in Figure 5 where the cut B' is being made with the clearance P and the first lug is being completed.

The third operation in this process is shown in Figure 6 where the cut C' is being made with the clearance Q and the second and third lugs are being completed.

In Figures 1 to 6, inclusive, I have illustrated my novel processes of manufacturing a castellated, slotted or similar nut where the saws are offset with the first saw to one side of the center line X—X of the nut blanks, the second saw offset to the opposite side thereof and the third saw in alignment with the first.

It will be observed from the foregoing that in the method illustrated in Figures 1 to 6 inclusive, the number of cuts correspond to the number of castles to be made, and that the blank is indexed through an angle equal in degrees to one-half the quotient arrived at by dividing the circumference of the blank (360°) by the number of locking lugs to be formed.

In addition to these operations as described I may also accomplish the same results by offsetting the saws in reverse arrangement respectively with reference to the center line X—X, i. e., on opposite sides of the center line than as shown in Figures 1 to 6, inclusive, and indexing the blanks to the left instead of to the right.

Furthermore my processes provide for the manufacture of castellated, slotted or similar nuts where the offsetting is arranged according to either of the methods described and the blanks are acted upon by the saws while being passed under them from right to left instead of from left to right.

In addition my processes provide for the manufacture of castellated, slotted or similar nuts where only one saw is used and the blanks are acted upon by it while being successively passed under it as many times as cuts are required for forming passages for receiving the cross key. In this case either the saw or the blanks may be offset as required for each operation in order to provide the necessary relationship between the different controlling factors in my processes as previously described.

Figure 7:
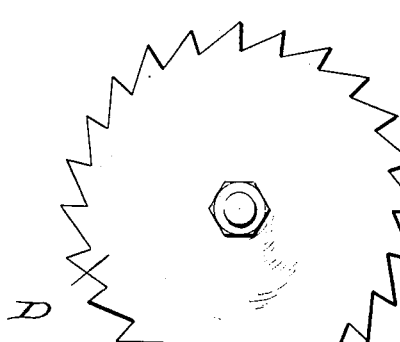
Figure 7 represents a side view of a nut blank and a saw in one of the typical cutting operations.

In Figure 7 I have illustrated a side view of a saw D and a nut blank where the saw is rotating clockwise and the blank S is being acted upon while travelling under it to the right. This is typical of one of the cutting operations heretofore described. The mechanism which supports the blank and which carries it successively beneath the saws is not illustrated as this is unnecessary.

Figure 8:
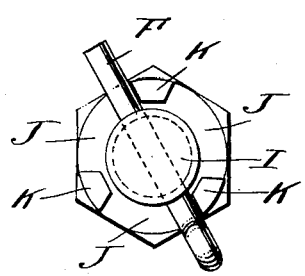
Figure 8 represents a plan view of the fabricated nut, assembled with a bolt and cotter key, where the clearance has been provided on the inner faces of the locking lugs and shows the alignment of the cotter pin with reference to the symmetrical walls of the locking lugs of the nut.

In Figure 8 I have illustrated a plan view of a nut, bolt and cotter key assembly showing the nut fabricated from a blank according to the process shown in Figures 4 to 6, inclusive after the operations described in that process have been completed and the nut blank has been tapped. It will be evident from an inspection of the drawing that the nut has the required odd number of locking lugs K, three in this case; that they are so arranged that an opening J is opposite each lug; that the lugs are in pairs on the same side of a diameter of the nut and are parallel to it; that the symmetrical walls of the locking lugs on opposite sides of the nut are in alignment; that the lugs are formed by the stock which is left between the openings; that they have no threads on their inner faces; that they have a clearance on their inner faces; that the openings are parallel to a diameter of the nut; that they are of the correct width to receive the cotter key and that the latter is so lined up that it engages the walls of the locking lugs and provides a positive lock to prevent the nut from turning; and that the nut is lighter in weight than the conventional nut because it has more material removed in the cutting operations than is the case of the ordinary nut of the same size.

Figure 9:
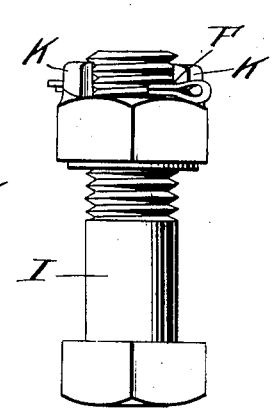
Figure 9 represents a side view of a typical nut and bolt assembly.

In Figure 9 I have illustrated a side view of the nut as it appears in use. It is assembled on a bolt I, of any usual type, having a diametrical opening in the threaded end for securing a cross key F here shown as a cotter pin.

Figure 10:
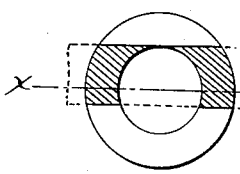
Figure 10 represents a plan view of a nut blank upon which the first cutting operation is being performed in a process similar to that illustrated in Figures 1 to 3, inclusive, except that the blank is being rotated through an angle of 120° instead of through an angle of 60°.
Figure 11:
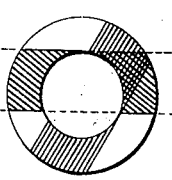
Figure 11 represents the second cutting operation in this process.
Figure 12:
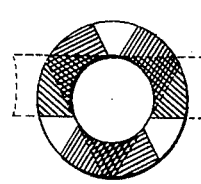
Figure 12 represents the third cutting operation in this process.

In Figures 10 to 12, inclusive, I have illustrated my novel process for manufacturing a castellated, slotted or similar nut where the operations are the same as those described in connection with Figures 1 to 6, inclusive, except that the nut blank is indexed through an angle of 120° instead of an angle of 60° and that the saws are all offset on the same side of the center line X—X of the nut blank. In this modification the blank has to be totally indexed through twice the angular displacement as before (i. e., through an angle equal in degrees to the quotient arrived at by dividing the circumference of the blank in degrees by the number of locking lugs to be formed), but it is unnecessary to disalign the saws. In this method, as in the method illustrated in Figures 1 to 6 inclusive, it will be observed that the number of cuts is again equal to the number of lugs, and since the nut is made according to my invention with an odd number of lugs, the number of cuts made is therefore always odd.

In my illustrations I have shown a castellated nut where the castles or locking lugs are located on the top of the nut at the corners formed by the intersection of two of the faces which make up the sides of the hexagonal nut, however, my processes also provide for the manufacture of a castellated, slotted or similar nut where the castles are located on the top of the nut on the sides where the faces are located. It is obvious that I accomplish this result by so indexing the blank for the initial cutting operation, and consequently for each successive cutting operation, that the center line X—X passes through the corners of the nut instead of through its faces, thereby so locating the cross key passages or openings that the locking lugs are formed on top of the nut and opposite the faces instead of opposite the corners.

In all of the methods I have used for illustrative purposes, the locking lugs have been formed by trisecting one face of the nut with channels or slots of a width at least greater than the radius of the opening through the nut blank by a distance equal to substantially half the diameter of the standard cotter pin to be used with the nut, the channels or slots overlapping each other in geometrical arrangement at portions equally spaced about the axis of the nut blank.

While I have illustrated and described my processes as applying to the manufacture of a hexagonal castellated nut having three locking lugs where saws are used as the cutting instruments, it will be understood that the principle of my invention is applicable to the manufacture of nuts of all shapes and types having any odd number of locking lugs and that the metal may be removed by other suitable tools without departing from the fundamentals of the said invention.

The aforegoing detailed description has been given for purposes of illustration of the invention and no undue limitations should be deduced therefrom, but the appended claims should be construed as broadly as permissible in view of the prior art.

Having thus described my invention what I claim as new, and desire to secure by U. S. Letters Patent is:—

1. The method of manufacturing a nut having locking lugs thereon, comprising forming a channel across the face of the nut blank on which the locking lugs are to be formed, said channel being offset with reference to the axis of the blank by substantially half the diameter of the standard cotter pin to be used with the nut, and being of a width greater by the distance of offset than the radius of the opening in the blank, forming a second channel at an angle of substantially 60° with reference to the first said channel and offset from the axis of the blank in a direction opposed to the direction of offset of the first said channel, and forming a third channel at an angle of substantially 60° from said second channel and offset from the axis of the blank in the same direction as that of the first said channel.

2. The method of manufacturing a nut having locking lugs thereon comprising forming a channel across one face of the blank from which the nut is to be formed, said channel being offset with reference to the axis of the blank by a distance equal to substantially one-half the diameter of the cotter pin to be used with the nut and being of a width greater by the distance of offset than the radius of the opening in the blank, forming a second similar channel at an angle to the first said channel, and forming a third similar channel at an angle to the first and second said channels, said channels substantially trisecting the face of the blank and overlapping each other at portions equally spaced about the axis of the nut blank.

3. The method of manufacturing a nut having locking lugs comprising forming a channel across one face of the blank, said channel being offset with reference to the axis of the blank by substantially half the diameter of the standard cotter pin to be used with the nut and being of a width greater by the distance of offset than the radius of the opening in the blank, indexing the blank through an angle of substantially 120° and forming a similar channel similarly offset across the face of the blank, again indexing the blank through substantially 120° and again forming a similar channel similarly offset across the face of the blank.

4. The method of manufacturing a nut having locking lugs thereon comprising forming a channel across the face of the blank from which the locking lugs are to be formed, said channel being offset with reference to the blank by substantially half the diameter of the standard cotter pin to be used with the nut, and being of a width greater by the amount of offset and by the amount of clearance to be allowed on the inner faces of the locking lugs than the radius of the opening in the blank, indexing the blank and again forming a similar channel across the face thereof, one end of which overlaps one end of the first said channel, indexing the blank and forming a third similar channel across the face thereof, the ends of which overlap the ends of the said first and second said channels at the ends thereof opposite their overlapped ends.

5. The method of manufacturing a nut having locking lugs thereon comprising trisecting one face of the nut blank with channels of equal width offset from the axis of the blank by an amount equal to substantially one-half the diameter of the cotter pin to be used with the nut and being of a width greater than the radius of the opening in the blank by the distance of offset and by the clearance to be provided on the inner faces of the locking lugs, the channels overlapping at portions equally spaced about the axis of the nut blank.

6. The method of manufacturing a nut having an odd number of locking lugs thereon comprising forming a channel across the face of the nut blank on which the locking lugs are to be formed, said channel being offset with reference to the axis of the blank by substantially half the diameter of the cotter pin to be used with the nut and being of a width greater than the distance of offset by at least substantially the radius of the opening in the blank, indexing the blank and repeating the formation of the channel, and again indexing the blank, the process being carried through until the number of channels formed equals the number of locking lugs to be provided on the finished blank.

7. The method of manufacturing a nut having locking lugs thereon comprising forming a channel across the face of the nut blank on which the locking lugs are to be formed, said channel being offset with reference to the axis of the blank by substantially half the diameter of the cotter pin to be used with the nut and being of a width greater by the distance of offset than at least substantially the radius of the opening in the blank, indexing the blank through an angle equal in degrees to half the quotient arrived at by dividing the circumference of the blank in degrees by the number of locking lugs to be formed, forming a second similar channel offset from the axis of the blank in a direction opposed to the direction of offset of the first said channel, again indexing the blank through a similar angle, forming a similar channel offset in the same direction as that of the first said channel, and so on until the number of channels formed equals the number of lugs to be provided on the blank.

8. The method of manufacturing a nut having an odd number of locking lugs thereon comprising forming a channel across the face of the nut blank on which the locking lugs are to be formed, said channel being offset with reference to the axis of the blank by substantially half the diameter of the cotter pin to be used with the nut and being of a width greater than the distance of offset by at least substantially the radius of the opening in the blank, indexing the blank through an angle equal in degrees to the quotient arrived at by dividing the circumference of the blank in degrees by the number of locking lugs to be formed, forming a second similar channel similarly offset from the axis of the blank, and so on alternately indexing the blank and forming channels therein until the number of channels formed equals the number of lugs to be provided on the blank.

WILLIAM McLURE ROSBOROUGH.